Sept. 16, 1969  G. A. SHIFRIN  3,467,474
LASER MACHINING APPARATUS
Filed Jan. 3, 1966  3 Sheets-Sheet 1

Gordon A. Shifrin,
INVENTOR.
BY

ATTORNEY.

Sept. 16, 1969   G. A. SHIFRIN   3,467,474
LASER MACHINING APPARATUS
Filed Jan. 3, 1966   3 Sheets-Sheet 2

United States Patent Office 3,467,474
Patented Sept. 16, 1969

3,467,474
LASER MACHINING APPARATUS
Gordon A. Shifrin, Malibu, Calif., assignor to Hughes Aircraft Company, Culver City, Calif., a corporation of Delaware
Filed Jan. 3, 1966, Ser. No. 518,457
Int. Cl. G01b 11/26
U.S. Cl. 356—138    2 Claims

ABSTRACT OF THE DISCLOSURE

A mounting assembly to improve laser machining is disclosed. The lasing device and end reflecting mirrors are each independently mounted from a common supporting column. The laser device is mounted so that its longitudinal axis may be moved angularly in space and means are provided to angularly move the respective mirrors in space so that the optically flat surfaces thereof will be in optimum relation to the axis of the lasing device. Energy loss due to beam scattering is thus avoided and more precise machining obtained.

---

The invention relates to an apparatus providing highly accurate control and flexibility in machining operations utilizing a laser as an energy source.

In recent years, lasers (lightwave amplification by stimulated emission of radiation) have been the subject of intensive investigations. One of many useful applications of lasers involves the direct machining of materials which are difficult to work by conventional modes because of the physical characteristic of the material. Extremely thin metallic sheets are an example.

Characteristically, lasers emit light that is collimated and polarized. This characteristic makes it possible to focus the light output in extremely small spots using tested optical principles. It has been found, for example, that the light energy may be focused in areas as small as 0.001 inch in diameter and it is expected that even smaller spot focus may be obtained with appropriate optical systems. Alternately, the focus of the laser energy may be enlarged to diameters as great as 0.030 inch and useful machining operations accomplished. In the area of beam energy impingement on a workpiece, a heating effect so intense can be created that even commonly high heat resistant materials are quickly vaporized. If required a moderated heating effect can also be achived. Drilling, welding material, etching and the like are some of the useful applications for a laser machining apparatus.

Since the mode of operation of laser energy source is well known, the particular structure and function thereof need not be described in detail. However, it will be understood that the apparatus herein described can utilize both a pulsed laser source or continuously operating source depending upon the particular machining operation being undertaken.

In order to ensure machining accuracy, efficiency and to lend flexibility to a laser machining apparatus, it is necessary that the axis of the output energy beam be accurately aligned and that the reflecting mirror components which have optically flat surfaces be located in true perpendicular relation to the beam axis. To these ends the machining apparatus of the present invention provides that the noted mirror components be independently mounted relative to the laser cylinder and means provided to independently adjust each mirror surface to a true perpendicular relation and alignment with the axis of the laser beam. In the particular case of lasers made from solid rods, such as the ruby or doped glass types, the angular divergence of the beam emitted from a cavity with detached mirrors will be substantially less than that from a cavity in which the mirrors are placed directly on the ends of the laser rod. Because the limiting size of the focused spot from the laser is proportional to both the beam divergence and the focal length of the objective lens, detached mirrors are of considerable value for micromachining applications. Additionally, the present invention provides a laser cylinder and particularly a mounting arrangement therefor accommodating universal adjustment so that the coincidence noted above between the beam axis, reflecting mirrors and workpiece may be easily attained and conveniently adjusted during use.

These and other advantages and features of the invention will become apparent in the course of the following description and from an examination of the related drawings wherein.

Figure 1:
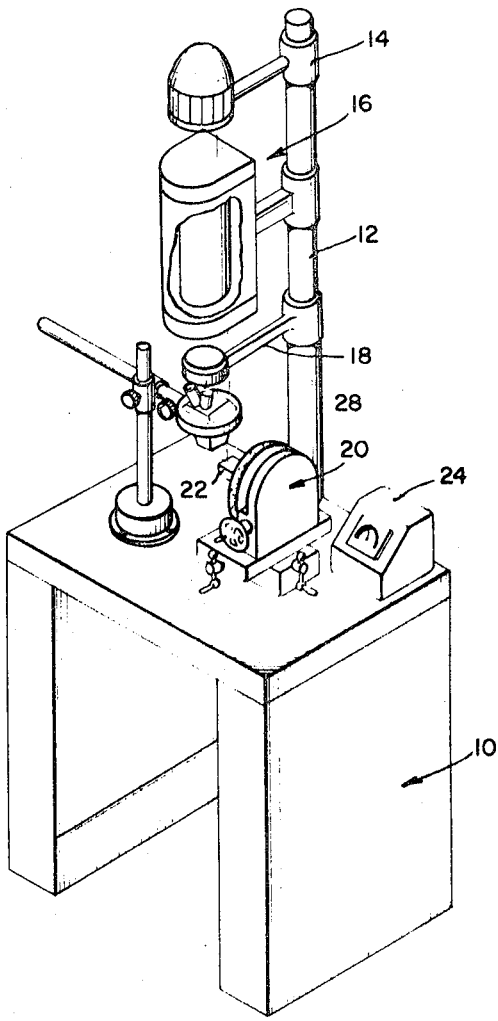
FIGURE 1 is a partially schematic perspective view of the apparatus hereunder consideration.

Describing the invention in detail and directing attention to FIG. 1, the numeral 10 designates a work table supporting the apparatus hereunder consideration. A vertical column 12 may be provided on the upper surface of the table 10, said column supporting in series relationship a collimated light source 14, a laser assembly indicated generally at 16, a lens support 18 and a work-positioning device 20. Assemblies 14, 16, 18 may be vertically adjustable to any fixed position on the column 12. It will also be understood that the laser assembly 16 is operatively connected to a laser power supply (not shown) in a conventional manner. The light source 14, laser assembly 16 and lens support 18, of course, are in vertical series relation and the work supporting device 20 may position a workpiece 22 vertically therebelow. A control device 24 for effecting the laser power supply is shown in FIG. 1 but the structure and operation thereof is not the subject of the herein disclosed invention.

Figure 2:
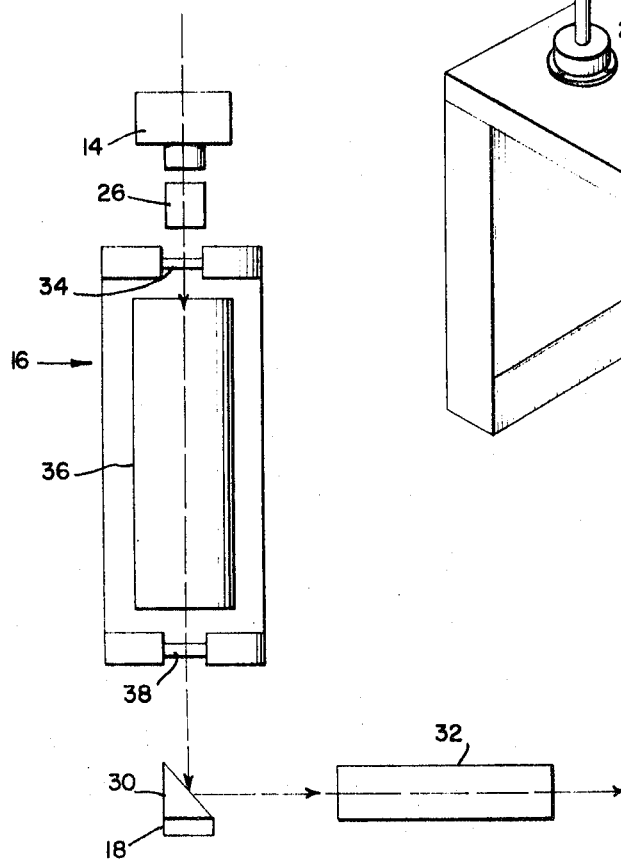
FIG. 2 is a schematic view illustrating the mode of achieving structural alignment.

As noted above, efficient laser machining requires that the axis of the produced beam be perpendicular to the conventional reflecting mirrors employed in such devices and the beam axis further be accurately aligned with the axis of the focusing or objective lens which controls impingement of beam energy on the workpiece. In order to accomplish this alignment, and assuming, for example, a laser employing a cavity disposed ruby as the energy source, attention is directed to FIG. 2, though schematic, will serve to illustrate the contemplated mode of alignment. A source of collimated light 14 is provided, for example, a gas laser or a xenon arc lamp with an appropriate projection system. Immediately therebelow a lens system 26 is provided to project the collimated light on the laser assembly for optical transmission to infinity. At the supporting assembly 18 the normally used beam splitter is temporarily replaced by a reflecting mirror or prism 30 (FIG. 2). The reflecting prism or mirror may be interchangeable with a beam splitter hereinafter described. The mirror 30 reflects light received at an angle of 90° with respect to the axis of light transmission and a conventional telescope or other magnifying device 32 is utilized as an alignment viewer. The point of light transmitted from the source 14 passes through an upper laser mirror 34, the laser ruby located in laser cylinder 36 which also contains the flashlamp and surrounding reflector and through lower mirror 38 and is reflected by prism 30 to the alignment viewer 32. The operator, at the alignment viewer 32, visually observes a plurality of light spots each representing a singly or multiply reflected image of the collimated light source. Angular adjustment of the mirrors as hereinafter described, will enable the operator to bring the spots into essentially congruent coincidence so that the simplest pattern of spots is seen at the viewer, and, in that particular spatial condition the optically flat surfaces of the mirrors 34 and 38 will both be perpendicular to a vertical line passing therethrough. The surfaces therefor are parallel in space. Thereafter, angular adjustment of the laser cylinder 36 in the manner hereinafter described will identify to the viewer a plurality of different light spots which results from transmission through and reflection from the laser rod, and, further angular adjustment of the cylinder 36 will enable the viewer to bring the spots into congruent coincidence and also into essentially congruent coincidence with the spots transmitted by the mirrors 34 and 38. Upon completion of this adjustment, it will be apparent that the axis of the laser rod will be in perfect vertical alignment and the axis of the produced beam will be perpendicular to the optically flat surfaces of mirrors 34 and 38. Upon removal of the reflecting mirror 30, the noted beam axis will also be accurately aligned with the axis of the objective lens which has been undisturbed in the system as hereinafter noted. Thus, in the operation of the apparatus there will be minimum energy loss as a result of beam scattering and accurate beam focusing will be obtainable. Thus the efficiency and effectiveness of machining operations are achieved.

Figure 6:
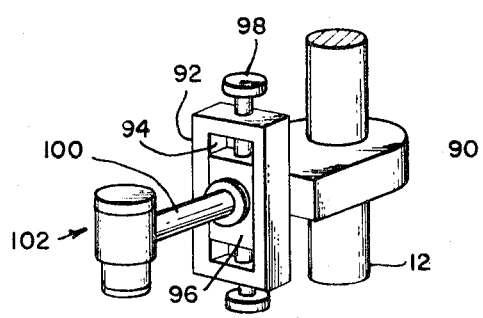
FIG. 6 is a fragmentary view showing an adjustment mechanism for the objective optics.
Figure 7:
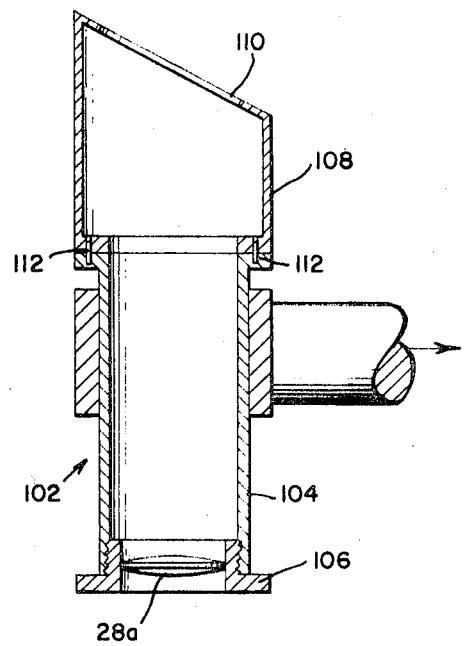
FIG. 7 is a vertical sectional view of the objective lens structure.

The lens support indicated at 18 in FIG. 1 is somewhat schematic and an alternate structure providing fine or vernier adjustment of the objective lens is shown in FIGS. 6 and 7. Again, an adjustable collar 90 is provided to support the arrangement from the vertical column 12. The collar 90 has secured to the front face thereof a housing 92, the latter defining an internal cavity 94 which provides guiding ways for a support element 96. A journalled and manually turnable adjustable screw 98 is carried by the housing 92 and threadably connected to support element 96 so that the block may be moved vertically in relatively fine increments. A bar 100 projects from the element 96 and carries at the outer end thereof an objective lens housing structure, indicated generally at 102. The housing structure 102 is shown in vertical sectional view in FIG. 7 and comprises a first cylinder 104, threadably carrying, at the lower end thereof, a lens support 106, the latter having objective lens 28a mounted therein.

At the upper end of cylinder 104 a second housing 108 is provided, said housing supporting in its upper aspect a beam splitting element 110 (hereinbefore referred to) having its surface in angular relation to the vertical axis of housing 104. As noted above the beam splitter 110 may be of such design that it will transparently pass a major percentage of the laser beam energy. It is this transmitted energy that is utilized to accomplish the machining hereunder consideration. A small percentage of the laser energy may be reflected by the splitter 110 in angular relation to the axis of the laser beam, said reflected energy may then be monitored by a conventional calorimeter (not shown) so that, by appropriate calibration, intelligence may be obtained which will indicate the total energy of the beam.

It is noted that the housing 108 is connected to the housing 104 by means of pins 112, 112. Thus the housing 108 may be removed from the housing 104 and the mirror or reflecting prism 30 hereinabove referred to may replace the beam splitter 110 during the apparatus alignment above described.

Figure 3:
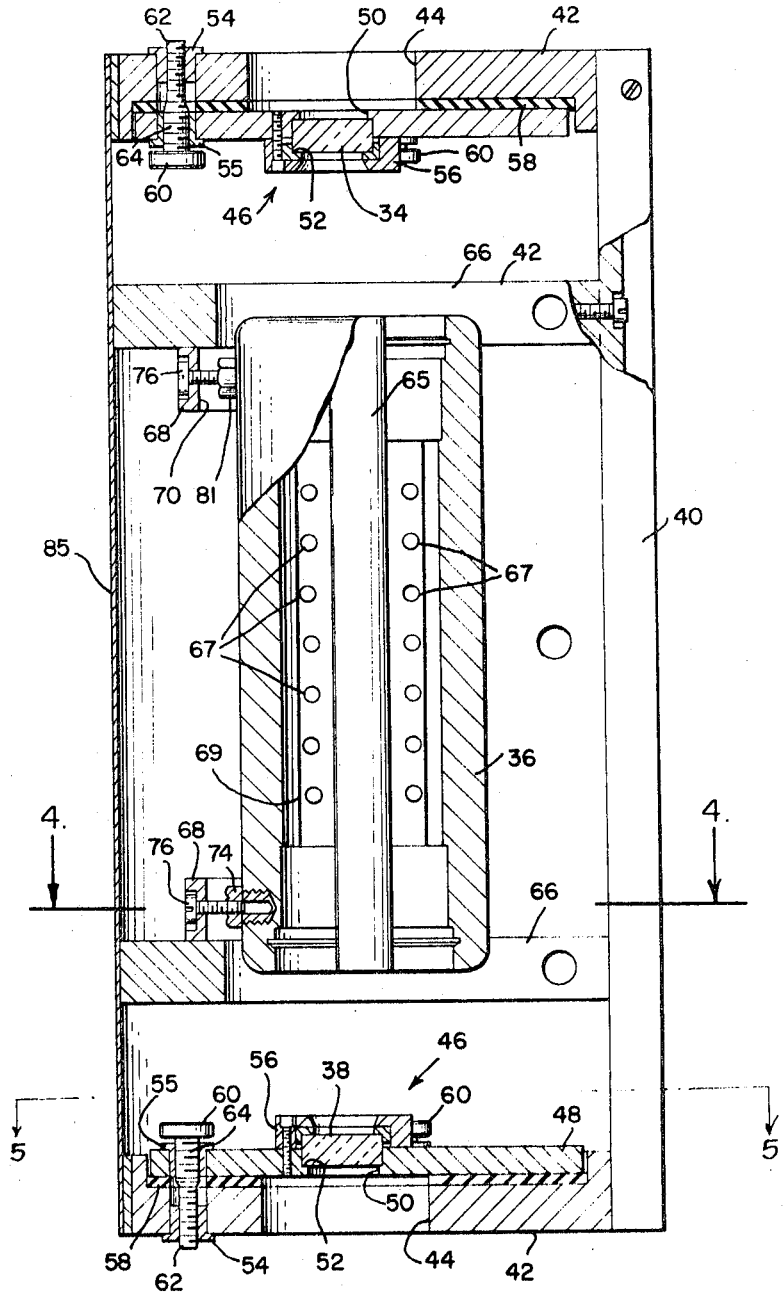
FIG. 3 is a partially sectioned side elevational view of the aligning structure employed.
Figure 4:
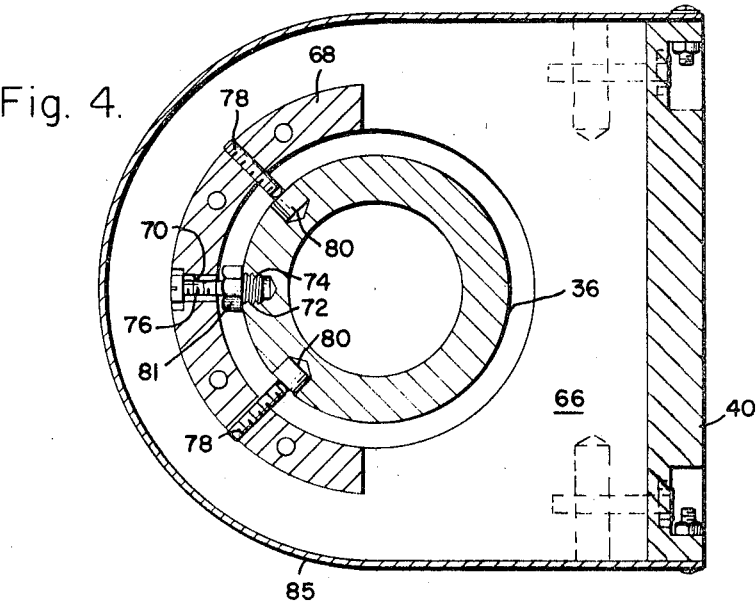
FIG. 4 is a sectional view taken along line 4—4 of FIG. 3.
Figure 5:
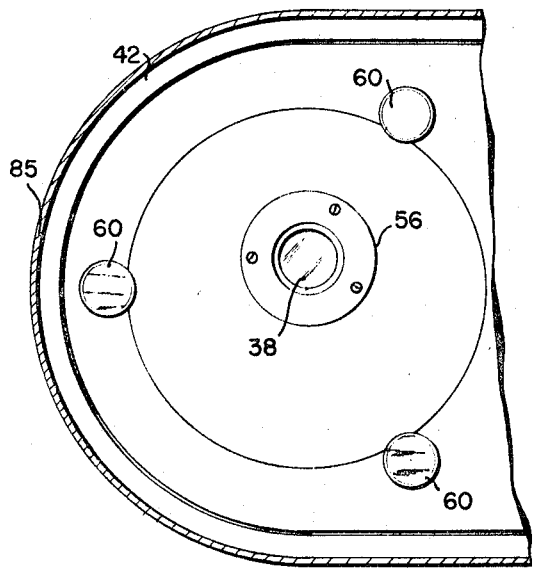
FIG. 5 is a sectional view taken along line 5—5 of FIG. 3.

Attention is now directed to FIGS. 3-5 which illustrate, in detail, the laser assembly 16 and particularly the structure utilized to accomplish the adjustment above described.

The assembly 16 comprises a back plate 40 which may be conventionally mounted to the post 12 as shown in FIG. 1. A pair of end plates 42, 42 are connected to the back plate 40 projecting forwardly therefrom. The end plates 42 are provided with apertures 44 and a mirror mounting structure indicated generally at 46. The structure 46 is identical for both end plates 42 and comprises a mirror support plate 48 having aperture 50 therein, each aperture 50 being shouldered as at 52 to support mirrors 34 and 38, respectively. The mirrors are held to the plate 48 by cap screw mounted clamping ring 56. It is preferred that the central axis of the mirror 34 whose diameter is generally much greater than the beam diameter be eccentrically arranged relative to the axis of the laser cylinder 36 as shown so that it may be rotated in its mounting in the event that the surface thereof is accidently damaged during the welding operations. Thus, even though a single mirror is accidently surface damaged, it may be rotated in its mounting and re-used several times. It will be recalled that it is only necessary that the optically flat surfaces of the mirrors 34 and 38 be perpendicular to the axis of the produced laser beam. It is not necessary that the beam and mirror axes coincide.

To accomplish the angular mirror adjustment above described, the support plate 48 is carried by end plate 42 in spaced relation therewith and interposed therebetween in a resilient gasket 58. To connect the support plate 48 to the end plate 42 three differential adjusting bolts 60, 60 are provided having a lower threaded segment 62 operatively associated through bushing 54 with end plate 42 and an upper threaded segment 64 operatively associated through bushing 55 with support plate 48. The segments 62 and 64 may be and preferably are right hand threads of different pitch. That is, segment 62 may have a coarser thread than segment 64. FIG. 5 will show that three adjusting bolts 60 are provided. As the respective adjusting screws are manually rotated, the plate 48 and the surfaces of mirrors 34 and 38 are adjusted through angular positions in space to bring the surfaces thereof in true parallel relation as above described.

To support the laser cylinder 36 a pair of spaced electrically insulating brackets 66, 66 are provided and conventionally mounted to back plate 40. Each bracket 66 carries a half-ring supporting element 68. The laser cylinder 36 is embraced by the half-ring elements 68 as is shown in FIG. 4.

As shown in FIG. 3 the cylinder 36 may conventionally contain a ruby laser rod 65 which may be activated or energized for the purposes hereunder consideration by flashlamps diagrammatically illustrated at 67, 67 and reflector element 69. The operation of the ruby laser is well known in the art and will not here be described in detail.

To support the cylinder 36 from the element 68 an opening 70 is provided in each ring element. Adjacent each opening the cylinder wall is tapped as at 72 and an element 74 is conventionally mounted therein. The element 74 is centrally threaded to receive one end of an adjusting cap screw 76. The screws 76 serve to support the cylinder 36 by forceably biasing the latter into abutting engagement with adjustable set screws 78, 78 which are linearly movable along axes arranged at a 90° included angle. Each adjusting screw 76 is bracketed by a pair of set screws 78. Hardened wear plugs 80, 80 are positioned within the wall of the cylinder 36 at the points of abutment with the set screws 78. The combination of the set screws 78 and adjusting screw 76 may be designated as an adjusting assembly. Note that the opening 70 is larger than the diameter of screw 76, thus accommodating transverse movement of the latter. Nuts 81 may be used to lock the cylinder 36 once adjustment is completed.

To accurately align the axis of the cylinder 36 and ruby 65 as above described, the respective set screws 78 may be adjustably rotated which accomplishes the angular repositioning of the cylinder 36. Upon achieving the desired setting of the upper and lower pairs of set screws 78, the respective adjusting screws 76 may be appropriately rotated to fixedly lock the cylinder 36 in abutment with the ends of the respective set screws 78. It will thus be apparent that the operator may accurately align the axis of the cylinder 36 and bring that axis into perpendicular relation with the optically flat surfaces of the respective mirrors 34 and 38.

Assembly 16 may be sealed with cover 85 to protect the optical surfaces from dust. This sealed structure can be flushed with dry gas to prevent moisture condensation on surfaces cooled by refrigerated cooling water in the laser flash chamber.

The invention disclosed provides a novel means for accurately aligning the operative parts of the laser machining apparatus to the end that the machining operation may be completed utilizing the laser energy to a maximum degree of efficiency, ensure accurate focusing of the laser beam at the workpiece and lend a degree of flexibility to provide for variation in machining operations.

The invention as disclosed is by way of illustration and not limitation and may be subject to various modifications without departing from the scope of the appended claims.

What is claimed is:

1. A mounting assembly for a laser machining apparatus comprising
    support means,
    a housing carried by the support means and having an axially elongated lasing device therein,
    means at opposed ends of the lasing device supporting the device from the housing comprising a pair of annular segment elements each fixed adjacent a respective end of said housing and each carrying means fixedly engaging said lasing device thereto,
    adjustable abutment means contacting said lasing device and associated with said last mentioned elements for aligning said lasing device,
    mounting means supporting optically flat mirrors from the housing at opposed ends of the device,
    said last mentioned mounting means accommodating independent spatial movement of the respective mirrors so that the optically flat surfaces thereof may be independently aligned with the longitudinal axis of the device,
    each of said last mentioned mounting means comprising a mirror support plate,
    resilient means interposed between the mirror support plate and the housing,
    a plurality of threadable adjusting members threadably connected to the support plate and the housing,
    the threaded connection between each adjusting member and the support plate having a different pitch than the threaded connection between each adjusting member and the housing whereby rotation of the respective adjusting members induces spatial movement of the support plate and the related mirror,
    at least one of said mirrors having its axis eccentrically arranged with respect to the long axis of the device to rotatively align various portions of said at least one of said mirrors with the longitudinal axis of said device.

2. A mounting arrangement for a laser machine apparatus according to claim 1, and including
    an objective lens support element carried by the support means,
    said support element including a journalled guide and screw means operatively connected to the journalled guide to move the latter and the objective lens incrementally in space to provide fine spatial adjustment thereof.

References Cited

UNITED STATES PATENTS

| | | | |
|---|---|---|---|
| 589,137 | 8/1897 | Muller | 308—32 |
| 2,488,654 | 11/1949 | Axe | 308—32 |
| 3,225,307 | 12/1965 | Weissman | 331—94.5 |
| 3,229,224 | 1/1966 | Waly et al. | 331—94.5 |
| 3,265,855 | 8/1966 | Norton | 331—94.5 X |
| 3,304,403 | 2/1967 | Harper | 331—94.5 X |
| 3,355,674 | 11/1967 | Hardy | 331—94.5 |
| 3,358,243 | 12/1967 | Collins et al. | 331—94.5 |
| 3,369,101 | 2/1968 | Di Curcio | 331—94.5 |

OTHER REFERENCES

Ready and Hardwick: Proc. I.R.E., vol. 50, No. 12, pp. 2483–4, December 1962.

JEWELL H. PEDERSEN, Primary Examiner

T. MAJOR, Assistant Examiner

U.S. Cl. X.R.

331—94.5